(12) United States Patent
Yoshida

(10) Patent No.: US 9,753,678 B1
(45) Date of Patent: Sep. 5, 2017

(54) SYSTEM AND METHOD FOR DISPLAYING COLOR REPRODUCTION STATUS ON A JOB SCHEDULING SCREEN

(71) Applicant: Konica Minolta Laboratory U.S.A., Inc., San Mateo, CA (US)

(72) Inventor: Hidetaka Yoshida, Foster City, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 0 days.

(21) Appl. No.: 15/280,162

(22) Filed: Sep. 29, 2016

(51) Int. Cl.
G06F 15/00 (2006.01)
G06F 3/12 (2006.01)
G06K 1/00 (2006.01)
H04N 1/00 (2006.01)

(52) U.S. Cl.
CPC ............ G06F 3/1217 (2013.01); G06F 3/126 (2013.01); G06F 3/1229 (2013.01); G06F 3/1288 (2013.01); H04N 1/00477 (2013.01); H04N 2201/0094 (2013.01)

(58) Field of Classification Search
CPC ...... G06F 3/1217; G06F 3/1229; G06F 3/126; G06F 3/1288; H04N 1/00477; H04N 2201/0094

USPC ....................... 358/1.15, 1.1, 1.13, 1.14, 1.18
See application file for complete search history.

(56) References Cited

U.S. PATENT DOCUMENTS

| 8,233,815 | B2 | 7/2012 | Inenaga et al. |
| 2010/0046977 | A1* | 2/2010 | Inenaga ............. H04N 1/00408 399/81 |

* cited by examiner

*Primary Examiner* — Douglas Tran
(74) *Attorney, Agent, or Firm* — Buchanan Ingersoll & Rooney PC

(57) ABSTRACT

A method, job management apparatus, and computer program product are disclosed for a job management apparatus, the job management apparatus managing a print job for at least one printer, wherein the code computer readable code configured to cause the job management apparatus to display a job scheduling screen. The process includes (a) obtaining first information on a job to be executed by the at least one printer; (b) obtaining second information on color reproduction state of the at least one printer; and (c) generating the job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer.

20 Claims, 15 Drawing Sheets

Fig. 14

|  | Target color | | | Measured value | | | Color deference |
|---|---|---|---|---|---|---|---|
|  | L* | a* | b* | L* | a* | b* | ΔE |
| Patch [1] | L*target(1) | a*target(1) | b*target(1) | L*measured(1) | a*measured(1) | b*measured(1) | ΔE(1) |
| Patch [2] | L*target(2) | a*target(2) | b*target(2) | L*measured(2) | a*measured(2) | b*measured(2) | ΔE(2) |
| Patch [3] | L*target(3) | a*target(3) | b*target(3) | L*measured(3) | a*measured(3) | b*measured(3) | ΔE(3) |
| Patch [4] | L*target(4) | a*target(4) | b*target(4) | L*measured(4) | a*measured(4) | b*measured(4) | ΔE(4) |
| Patch [5] | L*target(5) | a*target(5) | b*target(5) | L*measured(5) | a*measured(5) | b*measured(5) | ΔE(5) |
| Patch [6] | L*target(6) | a*target(6) | b*target(6) | L*measured(6) | a*measured(6) | b*measured(6) | ΔE(6) |
| Patch [7] | L*target(7) | a*target(7) | b*target(7) | L*measured(7) | a*measured(7) | b*measured(7) | ΔE(7) |
| Patch [8] | L*target(8) | a*target(8) | b*target(8) | L*measured(8) | a*measured(8) | b*measured(8) | ΔE(8) |
| Patch [9] | L*target(9) | a*target(9) | b*target(9) | L*measured(9) | a*measured(9) | b*measured(9) | ΔE(9) |
| Patch [10] | L*target(10) | a*target(10) | b*target(10) | L*measured(10) | a*measured(10) | b*measured(10) | ΔE(10) |
| Patch [11] | L*target(11) | a*target(11) | b*target(11) | L*measured(11) | a*measured(11) | b*measured(11) | ΔE(11) |
| Patch [12] | L*target(12) | a*target(12) | b*target(12) | L*measured(12) | a*measured(12) | b*measured(12) | ΔE(12) |
| Patch [13] | L*target(13) | a*target(13) | b*target(13) | L*measured(13) | a*measured(13) | b*measured(13) | ΔE(13) |
| Patch [14] | L*target(14) | a*target(14) | b*target(14) | L*measured(14) | a*measured(14) | b*measured(14) | ΔE(14) |
| Patch [15] | L*target(15) | a*target(15) | b*target(15) | L*measured(15) | a*measured(15) | b*measured(15) | ΔE(15) |
| Patch [16] | L*target(16) | a*target(16) | b*target(16) | L*measured(16) | a*measured(16) | b*measured(16) | ΔE(16) |
| Patch [17] | L*target(17) | a*target(17) | b*target(17) | L*measured(17) | a*measured(17) | b*measured(17) | ΔE(17) |
| Patch [18] | L*target(18) | a*target(18) | b*target(18) | L*measured(18) | a*measured(18) | b*measured(18) | ΔE(18) |
| Patch [19] | L*target(19) | a*target(19) | b*target(19) | L*measured(19) | a*measured(19) | b*measured(19) | ΔE(19) |
| Patch [20] | L*target(20) | a*target(20) | b*target(20) | L*measured(20) | a*measured(20) | b*measured(20) | ΔE(20) |
| Patch [21] | L*target(21) | a*target(21) | b*target(21) | L*measured(21) | a*measured(21) | b*measured(21) | ΔE(21) |
| Patch [22] | L*target(22) | a*target(22) | b*target(22) | L*measured(22) | a*measured(22) | b*measured(22) | ΔE(22) |
| Patch [23] | L*target(23) | a*target(23) | b*target(23) | L*measured(23) | a*measured(23) | b*measured(23) | ΔE(23) |
| Patch [24] | L*target(24) | a*target(24) | b*target(24) | L*measured(24) | a*measured(24) | b*measured(24) | ΔE(24) |
| Patch [25] | L*target(25) | a*target(25) | b*target(25) | L*measured(25) | a*measured(25) | b*measured(25) | ΔE(25) |
| Patch [26] | L*target(26) | a*target(26) | b*target(26) | L*measured(26) | a*measured(26) | b*measured(26) | ΔE(26) |
| ... | ... | ... | ... | ... | ... | ... | ... |

Fig. 15

|  | printerA | | | printerB | | | Color deference |
|---|---|---|---|---|---|---|---|
|  | L* | a* | b* | L* | a* | b* | ΔE |
| Patch [1] | L*printerA(1) | a*printerA(1) | b*printerA(1) | L*printerB(1) | a*printerB(1) | b*printerB(1) | ΔE(1) |
| Patch [2] | L*printerA(2) | a*printerA(2) | b*printerA(2) | L*printerB(2) | a*printerB(2) | b*printerB(2) | ΔE(2) |
| Patch [3] | L*printerA(3) | a*printerA(3) | b*printerA(3) | L*printerB(3) | a*printerB(3) | b*printerB(3) | ΔE(3) |
| Patch [4] | L*printerA(4) | a*printerA(4) | b*printerA(4) | L*printerB(4) | a*printerB(4) | b*printerB(4) | ΔE(4) |
| Patch [5] | L*printerA(5) | a*printerA(5) | b*printerA(5) | L*printerB(5) | a*printerB(5) | b*printerB(5) | ΔE(5) |
| Patch [6] | L*printerA(6) | a*printerA(6) | b*printerA(6) | L*printerB(6) | a*printerB(6) | b*printerB(6) | ΔE(6) |
| Patch [7] | L*printerA(7) | a*printerA(7) | b*printerA(7) | L*printerB(7) | a*printerB(7) | b*printerB(7) | ΔE(7) |
| Patch [8] | L*printerA(8) | a*printerA(8) | b*printerA(8) | L*printerB(8) | a*printerB(8) | b*printerB(8) | ΔE(8) |
| Patch [9] | L*printerA(9) | a*printerA(9) | b*printerA(9) | L*printerB(9) | a*printerB(9) | b*printerB(9) | ΔE(9) |
| Patch [10] | L*printerA(10) | a*printerA(10) | b*printerA(10) | L*printerB(10) | a*printerB(10) | b*printerB(10) | ΔE(10) |
| Patch [11] | L*printerA(11) | a*printerA(11) | b*printerA(11) | L*printerB(11) | a*printerB(11) | b*printerB(11) | ΔE(11) |
| Patch [12] | L*printerA(12) | a*printerA(12) | b*printerA(12) | L*printerB(12) | a*printerB(12) | b*printerB(12) | ΔE(12) |
| Patch [13] | L*printerA(13) | a*printerA(13) | b*printerA(13) | L*printerB(13) | a*printerB(13) | b*printerB(13) | ΔE(13) |
| Patch [14] | L*printerA(14) | a*printerA(14) | b*printerA(14) | L*printerB(14) | a*printerB(14) | b*printerB(14) | ΔE(14) |
| Patch [15] | L*printerA(15) | a*printerA(15) | b*printerA(15) | L*printerB(15) | a*printerB(15) | b*printerB(15) | ΔE(15) |
| Patch [16] | L*printerA(16) | a*printerA(16) | b*printerA(16) | L*printerB(16) | a*printerB(16) | b*printerB(16) | ΔE(16) |
| Patch [17] | L*printerA(17) | a*printerA(17) | b*printerA(17) | L*printerB(17) | a*printerB(17) | b*printerB(17) | ΔE(17) |
| Patch [18] | L*printerA(18) | a*printerA(18) | b*printerA(18) | L*printerB(18) | a*printerB(18) | b*printerB(18) | ΔE(18) |
| Patch [19] | L*printerA(19) | a*printerA(19) | b*printerA(19) | L*printerB(19) | a*printerB(19) | b*printerB(19) | ΔE(19) |
| Patch [20] | L*printerA(20) | a*printerA(20) | b*printerA(20) | L*printerB(20) | a*printerB(20) | b*printerB(20) | ΔE(20) |
| Patch [21] | L*printerA(21) | a*printerA(21) | b*printerA(21) | L*printerB(21) | a*printerB(21) | b*printerB(21) | ΔE(21) |
| Patch [22] | L*printerA(22) | a*printerA(22) | b*printerA(22) | L*printerB(22) | a*printerB(22) | b*printerB(22) | ΔE(22) |
| Patch [23] | L*printerA(23) | a*printerA(23) | b*printerA(23) | L*printerB(23) | a*printerB(23) | b*printerB(23) | ΔE(23) |
| Patch [24] | L*printerA(24) | a*printerA(24) | b*printerA(24) | L*printerB(24) | a*printerB(24) | b*printerB(24) | ΔE(24) |
| Patch [25] | L*printerA(25) | a*printerA(25) | b*printerA(25) | L*printerB(25) | a*printerB(25) | b*printerB(25) | ΔE(25) |
| Patch [26] | L*printerA(26) | a*printerA(26) | b*printerA(26) | L*printerB(26) | a*printerB(26) | b*printerB(26) | ΔE(26) |
| . | . | . | . | . | . | . | . |
| . | . | . | . | . | . | . | . |
| . | . | . | . | . | . | . | . |

SYSTEM AND METHOD FOR DISPLAYING COLOR REPRODUCTION STATUS ON A JOB SCHEDULING SCREEN

FIELD OF THE INVENTION

The present disclosure relates to a system and method for displaying a color reproduction status on a job scheduling screen.

BACKGROUND OF THE INVENTION

In image forming apparatuses such as a printer, a copier, a scanner or a multi-functional printer, an image forming process is executed according to an image process request called a job. Conventionally, the image forming apparatus which can reserve a plurality of jobs and which executes the plurality of reserved jobs in order is widely used as the above image forming apparatus.

In the above described image forming apparatus, the image forming process stops when paper cannot be fed due to a cause such as insufficiency in paper or the like while the job is in execution. In such case, the image forming process remains in a stopped state until restart of the image forming process is instructed after the cause of stopping of the image forming process is removed by supplying paper, by carrying out change in setting condition of the job. Therefore, when a job in which the image forming process stops is included in the reserved jobs, there can be problems that utilization rate and a reproduction or decline in the productivity of the printer or image forming apparatus.

In order to prevent the utilization rate of the image forming apparatus from declining, it is desirable to know in the image forming process, where the job stops will occur and to perform or carry out the necessary processes before the image forming process stops, such as supplying the paper, changing the reserved order of execution of the job, holding the job, deleting the job, or changing the setting condition of the job.

In order to meet the due date for each job, the job management program has a job scheduling feature to help ensure the most efficient print order. However, if the job printing is stopped, for example, due to maintenance for color calibration and print shop may not be able to meet the due date. In order to avoid the delivery delay, the user may be able to reschedule or change the job order after maintenance has been performed. However, if the job orders are rescheduled, the due date for the job may not be met.

SUMMARY OF THE INVENTION

In consideration of the above issues, it would be desirable to have a system and method, which makes visible to a user, the impact of printer maintenance for job scheduling by displaying the color reproduction history and prediction of scheduled maintenance. Advantageously, by displaying the color reproduction status on the job scheduling screen for scheduled maintenance, the user can change or reschedule print jobs before printer maintenance occurs to improve productivity, accuracy of scheduling print jobs, and reduce down time for one or more printers of a plurality of printers, for example, in a print shop.

A computer program product comprising a computer usable non-transitory medium having a computer readable program code embedded therein for a job management apparatus is disclosed, the job management apparatus managing a print job for at least one printer, wherein the code computer readable code configured to cause the job management apparatus to display a job scheduling screen, the process comprising: (a) obtaining first information on a job to be executed by the at least one printer; (b) obtaining second information on color reproduction state of the at least one printer; and (c) generating the job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer.

A method is disclosed for generating a job scheduling screen on a job management apparatus, the job management apparatus managing a print job for at least one printer, the method comprising: (a) obtaining first information on a job to be executed by the at least one printer; (b) obtaining second information on color reproduction state of the at least one printer; and (c) generating the job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer.

A job management apparatus managing a print job for at least one printer is disclosed, the job management apparatus comprising: a processor configured to obtain first information on a job to be executed by the at least one printer; and obtain second information on color reproduction state of the at least one printer; and a job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 14 is an illustration of color calibration chart showing target color, measured value, and color deference for a plurality of patches in accordance with an exemplary embodiment.

FIG. 15 is an illustration of color difference between two printers in accordance with an exemplary embodiment.

DETAILED DESCRIPTION

Figure 1:
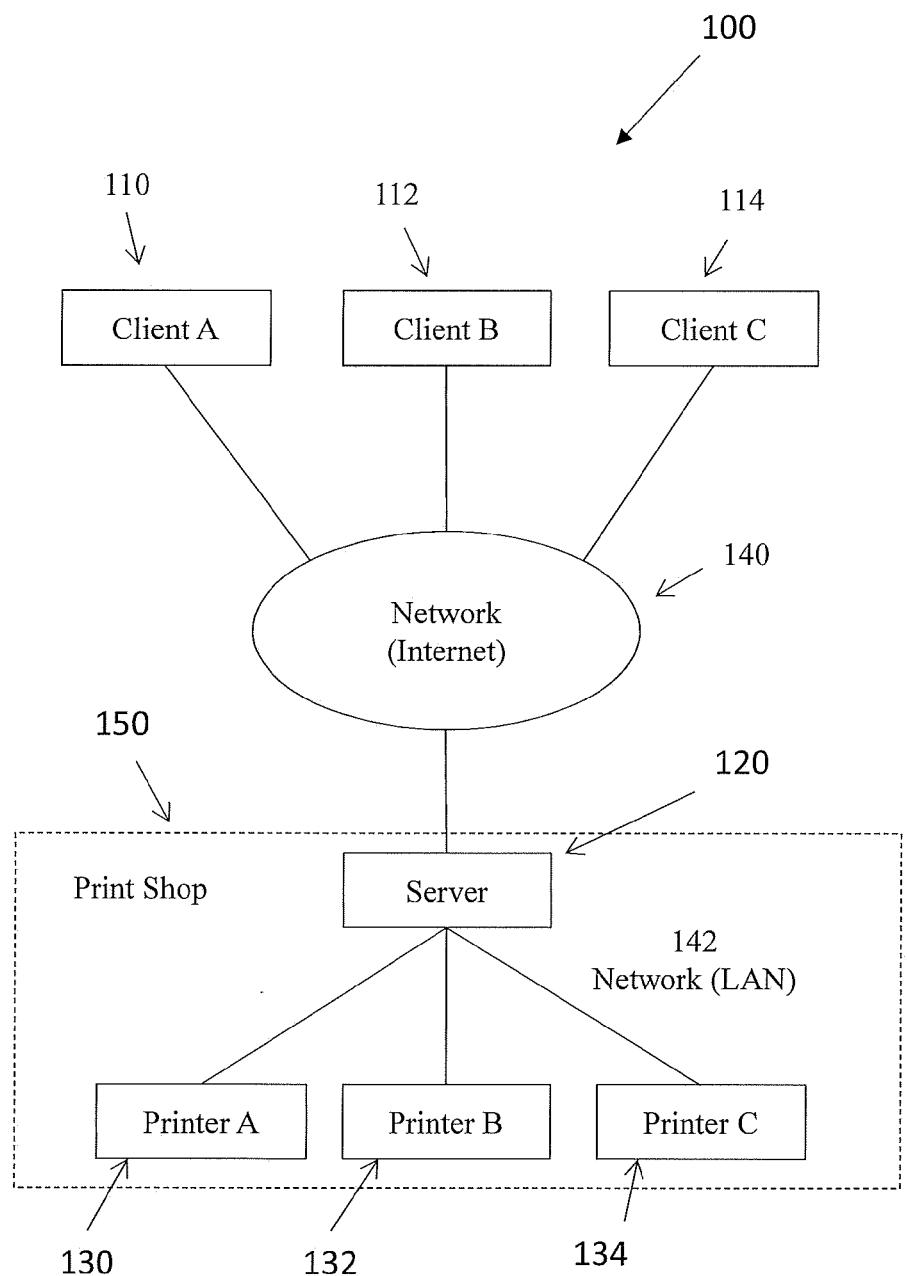
FIG. 1 is an illustration of an exemplary system for displaying a color reproduction status on a job scheduling screen in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of an exemplary system 100 for displaying a color reproduction status on a job scheduling screen in accordance with an exemplary embodiment. As shown in FIG. 1, the system 100 can include at least one host computer or client device 110, 112, 114, at least one server 120, and a plurality of printers or image forming apparatuses 130, 132, 134, which are connected, for example by a communication network (or network) 140 and/or a local area network (LAN) 142.

In accordance with an exemplary embodiment, the at least one host computer or client device 110 can be a computer, which is used by a customer of a print shop 150, for example, a Kinko's®. The customer can send a print job or print order to the print shop 150 using, for example, a Web browser via the network 140, 142. The data (or information) for the order may include a job ticket that defines print settings and due date for the order. The server 120 and the plurality of printers or image forming apparatuses 130 can be located in a single print shop 150. For example, the server 120 can be a computer, which is used by an operator in the print shop 150. The server 120 can assign a job corresponding to the order received from the at least one client 110, 112, 114 to at least one of the plurality of printers 130, 132, 134 and the at least one printer 130 executes the assigned job.

In accordance with an exemplary embodiment, the communication network or network 140, 142, can be a public telecommunication line and/or a network (for example, LAN or WAN). Examples of the communication network 140, 142 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF), infrared (IR) transmission, and/or near-field communication (NFC).

Figure 2:
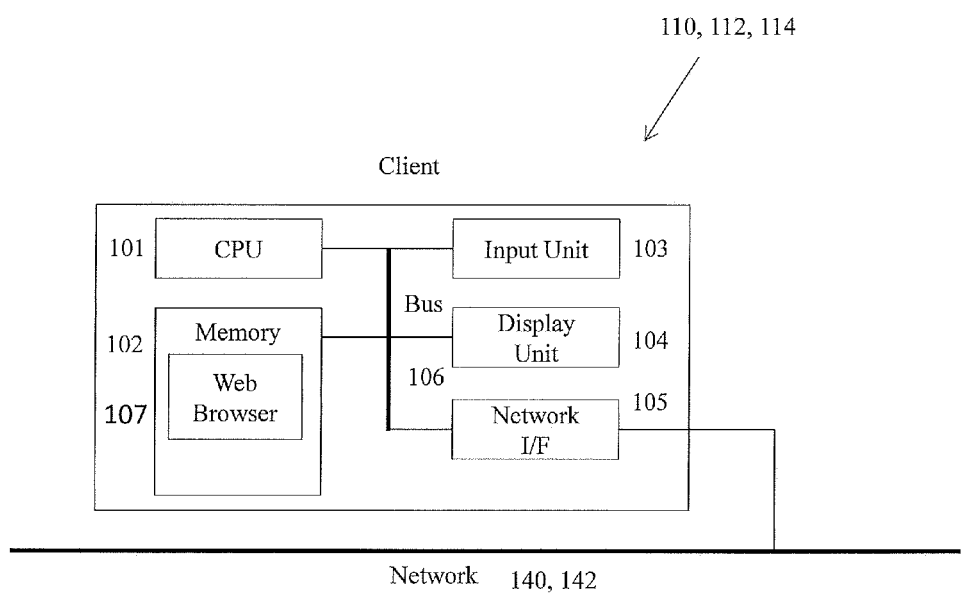
FIG. 2 is an illustration of a client device in accordance with an exemplary embodiment.

FIG. 2 is an illustration of a client device 110, 112, 114 in accordance with an exemplary embodiment. As shown in FIG. 2, the client device 110 can include a processor or central processing unit (CPU) 101, and one or more memories 102 for storing software programs and data (such as files to be printed) and a web browser 107. The web browser 107 of the client device is software to send data for a print job to the server 120. The data sent from the client device to the print server may include image data (document data) and print setting data. The image data and print setting data may be sent separately, or as a single file in ZIP or MIME format that includes the image data and print setting data. The processor or CPU 101 carries out the instructions of a computer program, which operates and/or controls at least a portion of the functionality of the client device 110. The client device 110 can also include an input unit 103, a display unit or graphical user interface (GUI) 104, and a network interface (I/F) 105, which is connected to a communication network (or network) 140. A bus 106 can connect the various components 101, 102, 103, 104, 105 within the at least one client device 110.

The client device 110, 112, 114 includes an operating system (OS), which manages the computer hardware and provides common services for efficient execution of various software programs. The software programs can include, for example, a web browser 107, can control transmission of data for a print job from the client device 110, 112, 114 to the server 120. In accordance with an exemplary embodiment, the client device 110, 112, 114, can be a computer, a tablet, a cell phone, or other device that can execute a web browser 107.

Figure 3:
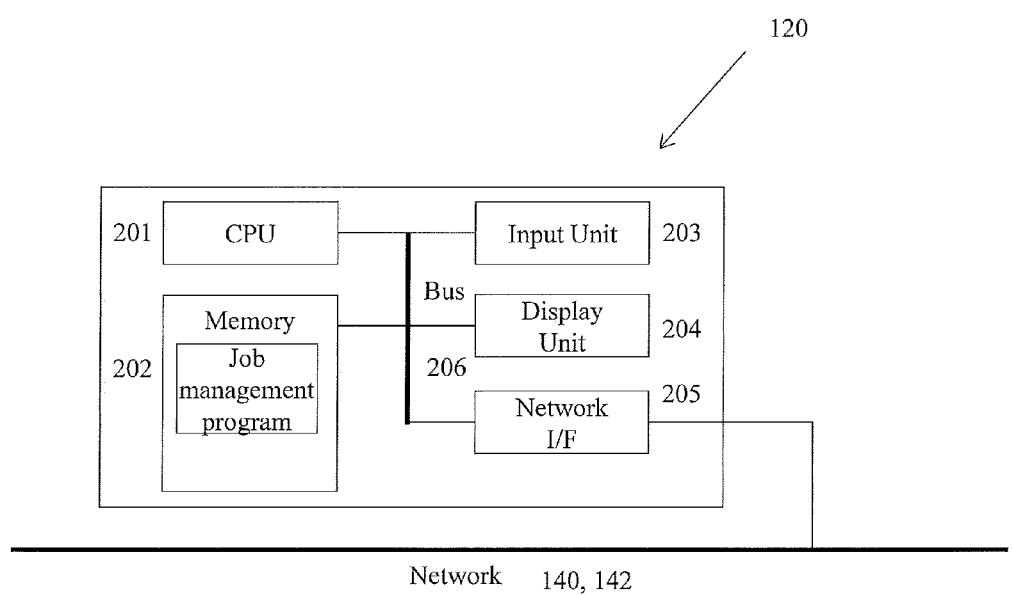
FIG. 3 is an illustration of a server in accordance with an exemplary embodiment.

FIG. 3 is an illustration of a server 120 in accordance with an exemplary embodiment. As shown in FIG. 3, the server 120 can include a processor or central processing unit (CPU) 201, and one or more memories 202 for storing software programs and data including a job management program. The processor or CPU 201 carries out the instructions of a computer program, which operates and/or controls at least a portion of the functionality of the server 120. The server 120 can also include an input unit 203, a display unit or graphical user interface (GUI) 204, and a network interface (I/F) 205, which is connected to a communication network (or network) 140. A bus 206 can connect the various components 201, 202, 203, 204, 205 within the sever 120. The server 120 includes an operating system (OS), which manages the computer hardware and provides common services for efficient execution of various software programs.

In accordance with an exemplary embodiment, the server 120 can be computer and executes a job management program that manages a print job. The server 120 assigns a job to least one printer 130, 132, 134, so that each job is executed by the best match printer 130, 132, 134, and all of the jobs (orders) that the printer shop 150 receives are efficiently executed. Specifically, the server (job management program) determines a job schedule regarding "by which printer" and "in what order" the print job should be executed.

Figure 4:
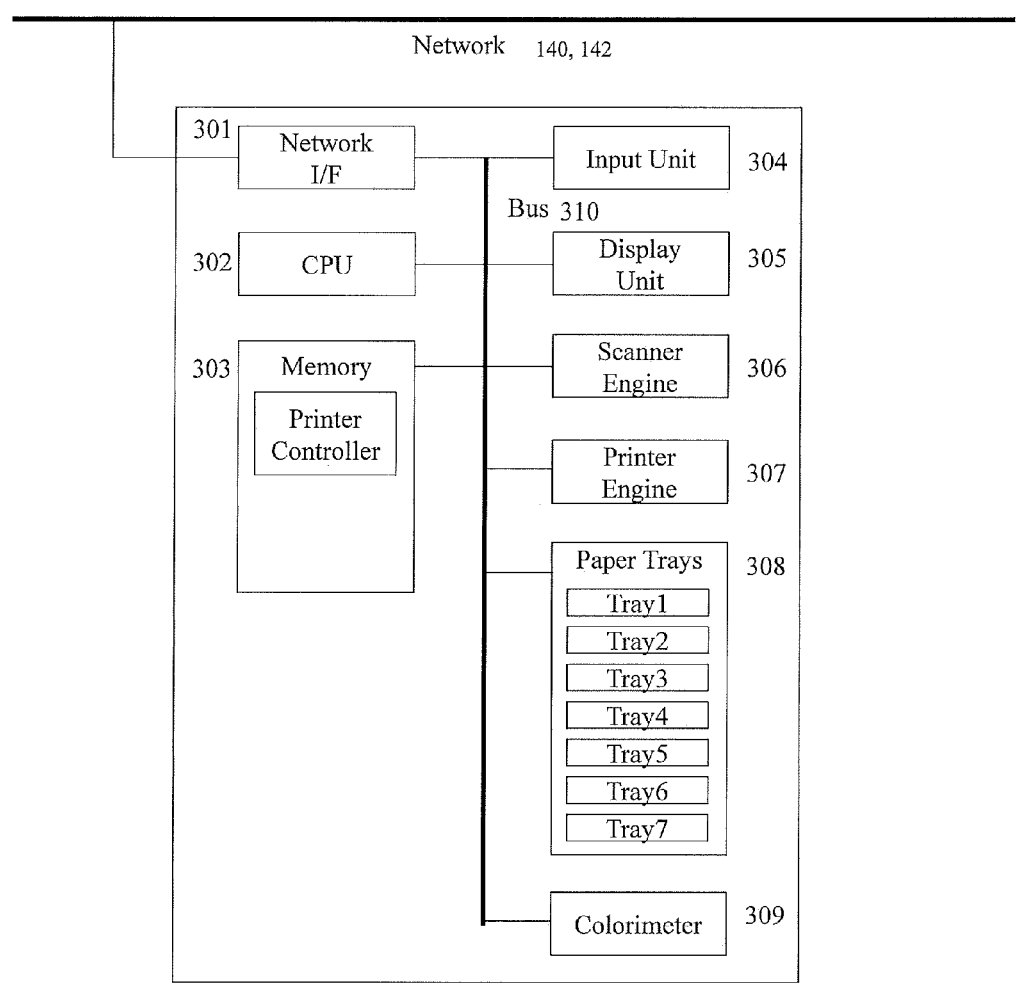
FIG. 4 is an illustration of a printer or image forming apparatus in accordance with an exemplary embodiment.

FIG. 4 is an illustration of a printer 130, 132, 134, in accordance with an exemplary embodiment. The printer 130, 132, 134, can include a network interface (I/F) 301, which is connected to the communication network (or network) 140, 142, a processor or central processing unit (CPU) 302, and one or more memories 303 for storing software programs and data (such as files to be printed). For example, the software programs can include a printer controller. The processor or CPU carries out the instructions of a computer program, which operates and/or controls at least a portion of the functionality of the printer 130, 132, 134. The printer 130, 132, 134, can also include an input unit 304, a display unit or graphical user interface (GUI) 305, a scanner engine (or scanner) 306, a printer engine 307, at least one paper tray 308, and more preferably a plurality of paper trays, 308, for example, Tray 1, Tray 2, Tray 3, Tray 4 . . . Tray N, and a colorimeter 309. The paper tray 308 can include a bin or tray, which holds a stack of a print media, for example, a paper or a paper-like product.

In accordance with an exemplary embodiment, for example, the colorimeter 309 can be one or more color sensors or colorimeters, such as an RGB scanner, a spectral scanner with a photo detector or other such sensing device known in the art, which can be embedded in the printed paper path, and an optional finishing apparatus or device (not shown). A bus 310 can connect the various components 301, 302, 303, 304, 305, 306, 307, 308, 309 within the printer 130. The printer 130, 132, 134, also includes an operating system (OS), which manages the computer hardware and provides common services for efficient execution of various software programs.

In accordance with an exemplary embodiment, it can be within the scope of the disclosure for the printer 130, 132, 134, to be a copier. The printer engine or print engine 307 has access to a print media of various sizes for a print job, which can be, for example, stored in the input tray. A "print job" or "document" can be a set of related sheets, usually one or more collated copy sets copied from a set of original print job sheets or electronic document page images, from a particular user, or otherwise related.

For example, in accordance with an exemplary embodiment, an image processing section within the printer 130, 132, 134 can carry out various image processing under the control of a print controller or CPU 302, and sends the processed print image data to the print engine 307. The image processing section can also include a scanner section (scanner 306) for optically reading a document. The scanner section receives the image from the scanner 306 and converts the image into a digital image. The print engine 307 forms an image on a print media (or recording sheet) based on the image data sent from the image processing section. The central processing unit (CPU) (or processor) 302 and the memory 303 can include a program for RIP processing (Raster Image Processing), which is a process for converting print data included in a print job into Raster Image data to be used in the printer or print engine 307. The CPU 302 can include a printer controller configured to process the data and job information received from the server 120, for example, received via the network connection unit and/or input/output section (I/O section) 304.

The CPU 302 can also include an operating system (OS), which acts as an intermediary between the software programs and hardware components within the printer 130, 132, 134. The operating system (OS) manages the computer hardware and provides common services for efficient execution of various software applications. In accordance with an exemplary embodiment, the printer controller can process the data and job information received from the one or more client devices 110 to generate a print image.

The network I/F 301 performs data transfer with the server 120. The printer controller can be programmed to process data and control various other components of the multi-function peripheral to carry out the various methods described herein. In accordance with an exemplary embodiment, the operation of printer section commences when it receives data for a print job from the server 120 via the network I/F 301. The data for the print job may include any kind of page description languages (PDLs), such as PostScript® (PS), Printer Control Language (PCL), Portable Document Format (PDF), and/or XML Paper Specification (XPS). Examples of printers 130, 132, 134, consistent with exemplary embodiments of the disclosure include, but are not limited to, a multi-function peripheral (MFP), a laser beam printer (LBP), an LED printer, and a multi-function laser beam printer including copy function.

In accordance with an exemplary embodiment, the color calibration of the printer 130, 132, 134 as shown in FIG. 4 can be performed by creating a color test pattern, for example, on the print controller of the CPU 302, which can be, for example, a Digital Front End (DFE) printer controller that can be set based on one or more print conditions, for example, after a specific number of print copies have been printed by the printer 130, 132, 134. With the calibration setting enabled, the color measurement pages 600 (FIG. 6) can be printed, and the one or more printed color patches 610 can be compared to a corresponding target color for each of the one or more printed color patches using the colorimeter 309. The color calibration patch 610 compared to the target color (or target color data) (FIG. 14) can determine the color rendering performance of print engine of the printer 130, 132, 134 and/or generating a color profile or difference between printers 130, 132, 134 as disclosed herein.

Figure 5:
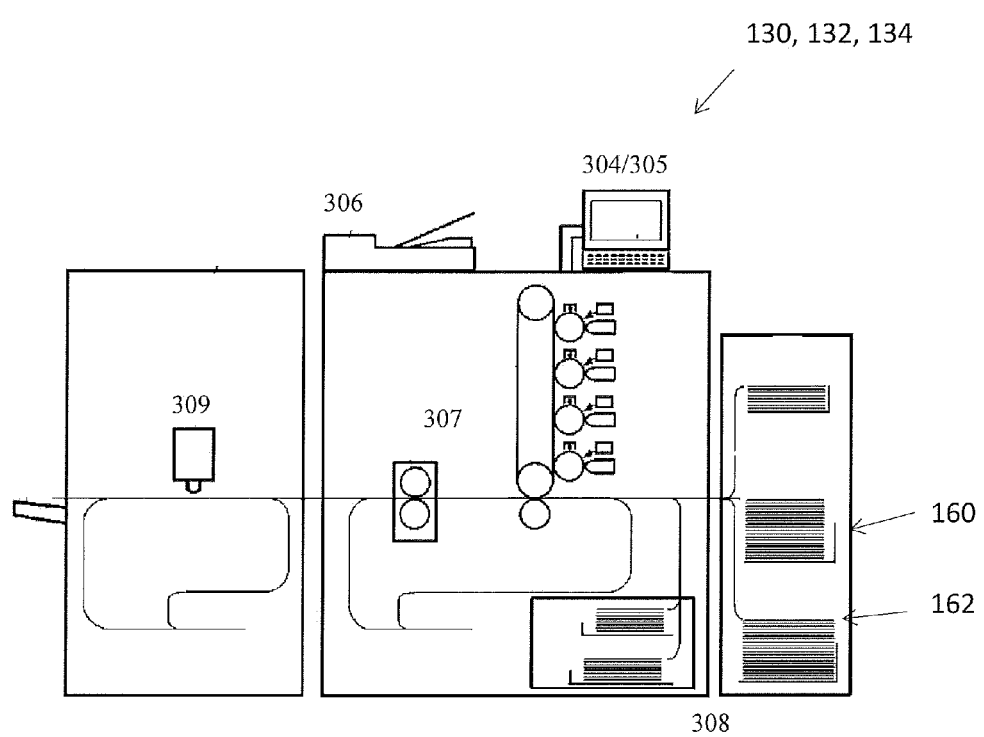
FIG. 5 is an illustration of a printer in accordance with an exemplary embodiment.

FIG. 5 is an illustration of a printer (or image forming apparatus) 130, 132, 134 in accordance with an exemplary embodiment. The printer 130, 132, 134 includes the input unit 304, the display unit or graphical user interface (GUI) 305, the scanner engine 306, the printer engine 307, the plurality of paper trays 308, for example, Tray 1, Tray 2, Tray 3, Tray 4 . . . Tray N, and the colorimeter 309. As shown in FIG. 5, each of the plurality of paper trays 308 can be configured to hold a print media 160, for example, a stack 162 of print media (or paper) 160.

In accordance with an exemplary embodiment, the print media 160 is preferably a paper or paper-like media having one or more print media attributes. The print media attributes can include, for example, paper color, coating, grain direction, printing technology, brightness, CIE, tint, whiteness, labColor, etc. In order to maximize print quality, the print media attributes of each type of print media should be input into or hosted on the printer 130, 132, 134, for example, on printer configuration settings of the printer 130, 132, 134 to obtain the highest quality output. Most print media 160 is provided in reams or other known quantities, which are packaged with indicia such as information on the manufacture, size, type and other attributes of the print media. The size of the print media 160, for example, can include letter, legal, A4, A3, tabloid, etc. In addition, most bundles or reams of paper include a UPC (Universal Product Code) or bar code, which identifies the type of print media 160 including manufacture of the print media.

Figure 6:
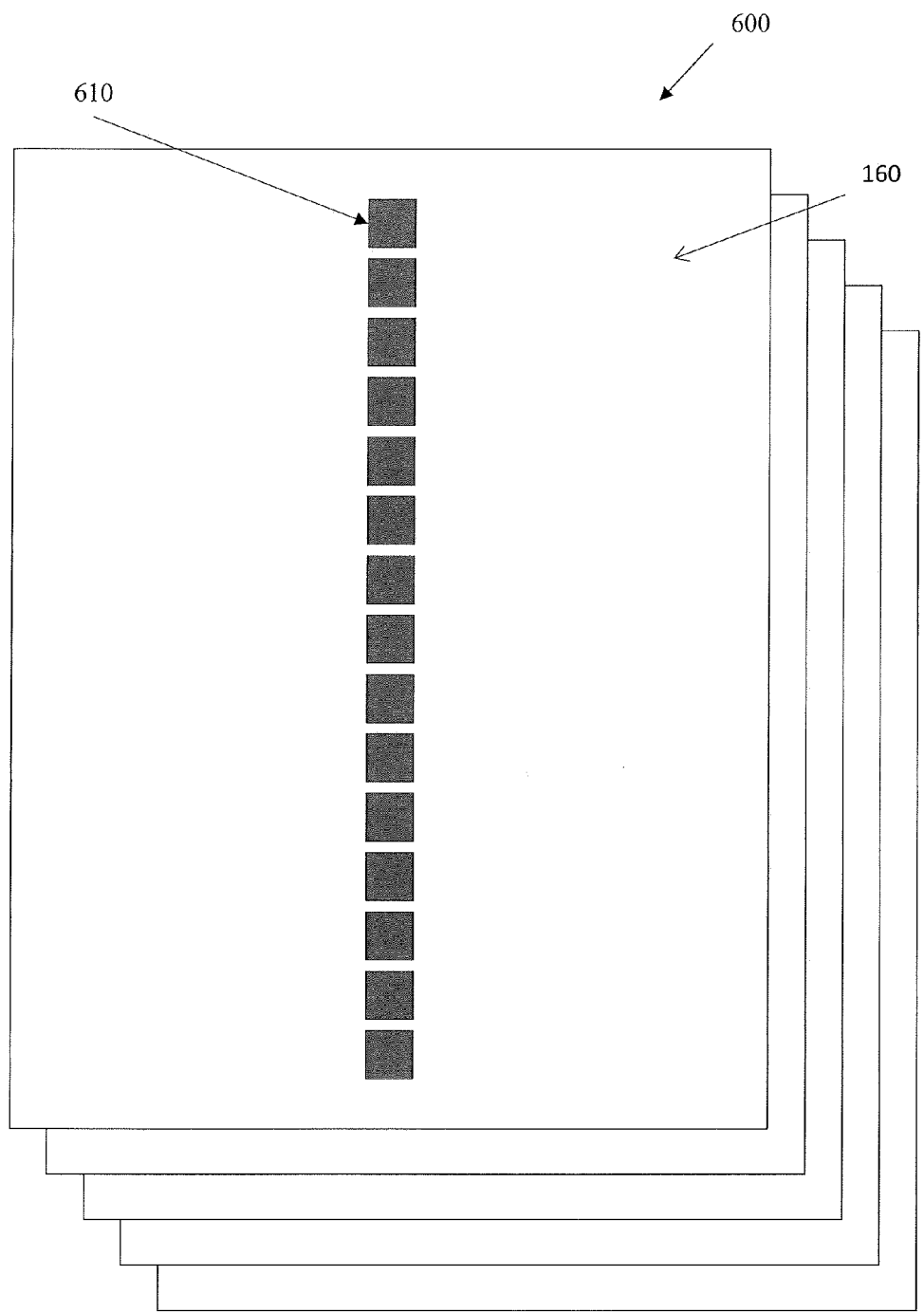
FIG. 6 is an illustration of a print media having color patches in accordance with an exemplary embodiment.

In accordance with an exemplary embodiment, at least one printer of the plurality of printers 130, 132, 134 can be a production printer like bizhub PRESS 1100 by Konica Minolta®. The printer 130, 132, 134 has an inline sensor (a colorimeter) 309 on a paper path so that the printer can measure the color quality (color characteristic) of print output 600 (FIG. 6). For example, the inline sensor may measure the L*a*b* values of color patches 610 printed on print media 620 as shown in FIG. 6.

In accordance with an exemplary embodiment, the printer 130, 132, 134, can validate its own color reproduction state by validation process, and if color reproduction status is not enough to execute a print job, the printer 130, 132, 134 can improve its own color reproduction state by automatically conducting the calibration process. The calibration process may be executed based on an operator's instruction independent from the color validation process.

In accordance with an exemplary embodiment, a job management program is disclosed, which can make a job print schedule for multiple printers 130, 132, 134 to make the most efficient print order. For example, the at least one printer 130, 134 can have an inline sensor (colorimeter 309) to measure the color reproduction of print output and the at least one printer 130, 132, 134 can validate the color reproduction state. If validation result is bad, the printer 130, 132, 134 is required to calibrate parameters on the color reproduction. For that calibration, job printing is stopped and it may require to reschedule the job order to meet the job due date. In accordance with an exemplary embodiment, by showing the color reproduction history and prediction on the job scheduling screen, a user can take the necessary action like rescheduling before maintenance, for example, recalibration occurs.

Figure 7:
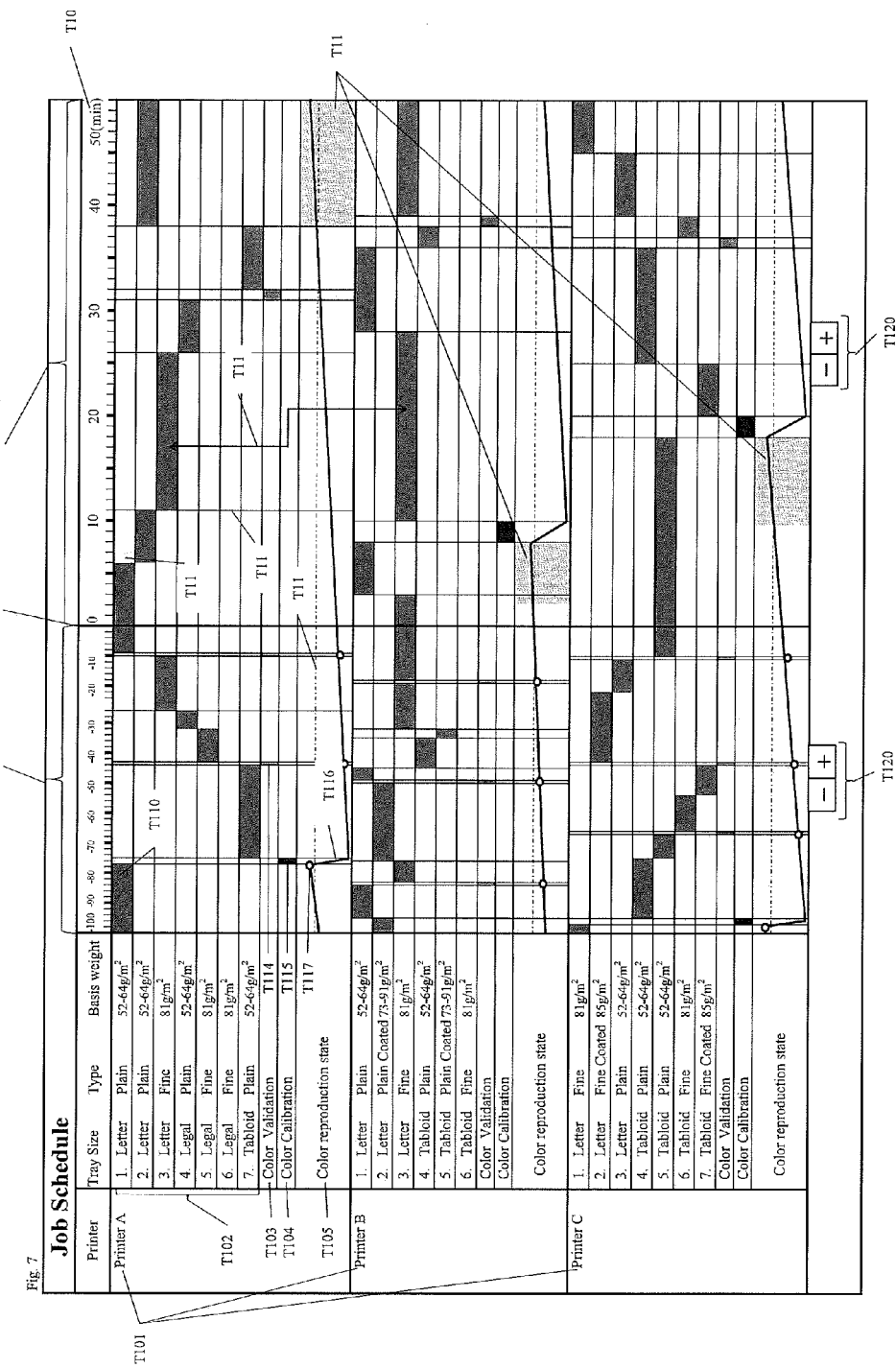
FIG. 7 is an illustration of a job scheduling window on a display unit of a graphical user interface of an exemplary client device, a server, and/or a printer for use with the system as shown in FIG. 1 in accordance with a first exemplary embodiment.

FIG. 7 is an illustration of a job scheduling window on a display unit or a graphical user interface 104 of an exemplary job management apparatus, which can be hosted, for example, on a server 120, and/or a printer 130, 132, 134 (an exemplary device), and for use with the system as shown in FIG. 1 in accordance with a first exemplary embodiment. In accordance with an exemplary embodiment, for example, the job scheduling window can be hosted on the server 120 and/or the at least one printer 130, 132, 134 via a communication network 140, 142. As shown in FIG. 7, the server 120 and/or the printer 130, 132, 134 has a job scheduling GUI (graphical user interface) 104, 204, 304. In accordance with an exemplary embodiment, the job management program, for example, hosted on the server 120, provides the job scheduling GUI 104, 204, 304, which shows the job schedule, the validation and calibration process schedule, and color reproduction information of each printer 130, 132, 134. The operator can assign a job to a proper printer 130, 132, 134 by seeing the job scheduling GUI 104, 204, 304.

As shown in FIG. 7, the vertical axis (or second axis) of the job scheduling GUI 104, 204, 304 can include an identification of a plurality of printers T101, a tray row T102, a color validation row T103, a color calibration row T104, and a color reproduction row T105. The horizontal axis (or first axis) can correspond to a time or paper count T10, and can include a history region T107, a present region T108, a prediction region T109, a job bar (or cell) T11, T111, a job separation line T112, a split job indicator T113, a color validation bar T114, a color calibration bar T115, a color reproduction graph T116, a measurement timing indicator T117, a criteria line T118, over criteria indicator T119, and a scale adjustor T120, T121.

In an alternative embodiment, an orientation of, for example, the plurality (or multiple) printers T101, the tray row T102, the color validation row T103, the color calibration row T104, and the color reproduction row T105 can be arranged on the horizontal axis, such that rather than rows, each is in a column format. In addition, in the alternative embodiment, the time or paper count T10, the history region T107, the present region T108, the prediction region T109, the job bar T11, T111, the job separation line T112, the split job indicator T113, the color validation bar T114, the color calibration bar T115, the color reproduction graph T116, the measurement timing indicator T117, the criteria line T118, the over criteria indicator T119, and the scale adjustor T120, T121 can be arranged on the vertical axis, such that rather than columns, each is in a row format. In accordance with an exemplary embodiment, the use of rows or columns can be interchanged, for example, depending on the orientation or axis in which the plurality of printers T101 and corresponding trays, color validation information, and time or paper count are arranged.

In accordance with an exemplary embodiment, the job scheduling GUI (or display) 104, 204, 304 is dynamically updated (for example, in real time), such that, the time, and corresponding bars and graphs as depicted on the job scheduling GUI 104, 204, 304, move, for example, to the left, as the execution histories of the one or more jobs, calibration, and validation for each of the plurality of printers 130, 132, 134 are received and processed, for example, by the server 120.

As shown on the vertical axis, in accordance with an exemplary embodiment, the plurality (or multiple) printers T101 being managed by the job management program are allocated along the vertical axis. In accordance with an exemplary embodiment, the printers T101 are registered to the program by the operator or the manager of the print shop 150 (for example, an administrator of the system) in advance. Each tray on the printer is separately allocated along the vertical axis. Each tray row T102 can include information corresponding to the tray, for example, tray number, paper size, paper type, paper color (not described) and basis weight of the paper within the tray. In addition, each tray row T102 can include the job bar T11, T111 that illustrates a job history or planned job (or forecasted job) that was/will be executed using the specified tray T102. In accordance with an exemplary embodiment, the color validation row T103 can include a color validation bar T114 that illustrates a history or plan of color validation that was/will be executed by the at least one printer 130, 132, 134.

In accordance with an exemplary embodiment, the color calibration row T104 can include a color calibration bar T115 that illustrates a history or plan of color calibration that was/will be executed by the printer 130, 132, 134. The color reproduction row T105 can include a graph (or line) that illustrates a history or prediction of color reproduction status T105.

As shown in FIG. 7, the horizontal axis corresponds to time (for example, minutes) or paper count T10. In accordance with an exemplary embodiment, the horizontal axis can be exchangeable between the time and paper count by a user operation, for example, by a click through or other known computer process or step. The horizontal axis can also include a history region (minus time or paper count) T107, a present region (or line) at time 0 (zero) and/or page count 0 (zero) T108, and a prediction (plan) region (time or page count) T109, which reflect the job history in a time increment and/or paper count. The history region T107, for example, illustrates actual histories of a job T11, T111, color validation T114, and color calibration T115. In accordance with an exemplary embodiment, the job bar T110, T111 illustrates time (or paper count) that the printer 130, 132, 134 spends for each job. In the prediction region T109, a probability of paper empty can be expressed or illustrated, for example, in a different color, for example, yellow T111.

In accordance with an exemplary embodiment, the operator can move a job bar to another tray row of the same or another printer by a drug and drop operation to the job bar. The operator also can split a single job bar with another tray row of another printer by drug and drop operation to the job bar. The job separate line T112 illustrates a border of each single job. The job management program can split an original single job into plural jobs (split jobs) so that the split jobs (original job) can be executed in parallel by multiple printers. The split job indicator T113 illustrates the relationship between plural split jobs that are split from a same original job.

In accordance with an exemplary embodiment, the color validation bar T114 illustrates time that spends for color validation process. The color calibration bar T115 illustrates time that spends for color calibration process. The color reproduction graph T116 illustrates color reproduction state at each point on the horizontal axis. The color reproduction state may be an average of color differences (delta E or AU of all color patches between measured L*a*b* value and target L*a*b* value (FIG. 14).

$$\Delta E_n = \sqrt{((L*_{target} - L*_{measured})^2 + (a*_{target} - a*_{measured})^2 + (b*_{target} - b*_{measured})^2)}$$

$$\text{Color reproduction state} = \frac{\left(\sum_{n=0}^{m} \Delta E_n\right)}{m}$$

In accordance with an exemplary embodiment, because the color validation process and the color calibration process are executed with some interval, even in the history and present regions T107, T108, the color reproduction state between the validation and/or calibration processes need to be calculated based on the actual values measured in the validation and/or calibration processes. The color reproduction state T105 may be calculated based on the actual values and the history of change of the values (collected spending a long time) using, for example, machine learning technology.

In accordance with an exemplary embodiment, in the prediction region T109, the color reproduction state T105 may be calculated based the actual values, the history of change of the values and a plan for a print job and calibration. In accordance with an exemplary embodiment, the measurement timing indicator T117 can indicate that the color reproduction state T105 at the point is calculated based on the actual values measured in the validation and/or calibration processes.

In accordance with an exemplary embodiment, for example, an operator can set a criterion (criteria) T118 on color reproduction state in advance. The criterion is depicted as a criteria line within color reproduction graph T116. The operator can judge when the validation and/or calibration process should be scheduled based on the color reproduction graph T116 and the criteria line T118. The over criteria indicator T119 indicates a region where color reproduction state is worse than the criterion T118. In accordance with an exemplary embodiment, the operator easily can judge when the validation and/or calibration process should be scheduled based on the indicator T119.

In accordance with an exemplary embodiment, the operator can change the scale of the horizontal axis using the scale adjustor T120, T121. For example, the scales for the history region T107 and the prediction region T109 can be adjusted independently using corresponding adjustors. In addition, the job bar T11, T111, job separation line T112, split job indicator T113, color validation bar T114, color calibration bar T115, color reproduction graph T105, measurement timing indicator T117, and over criteria indicator T119 can be moved to the right or to left along the horizontal axis with time using the scale adjustor T120, T121.

Figure 8:
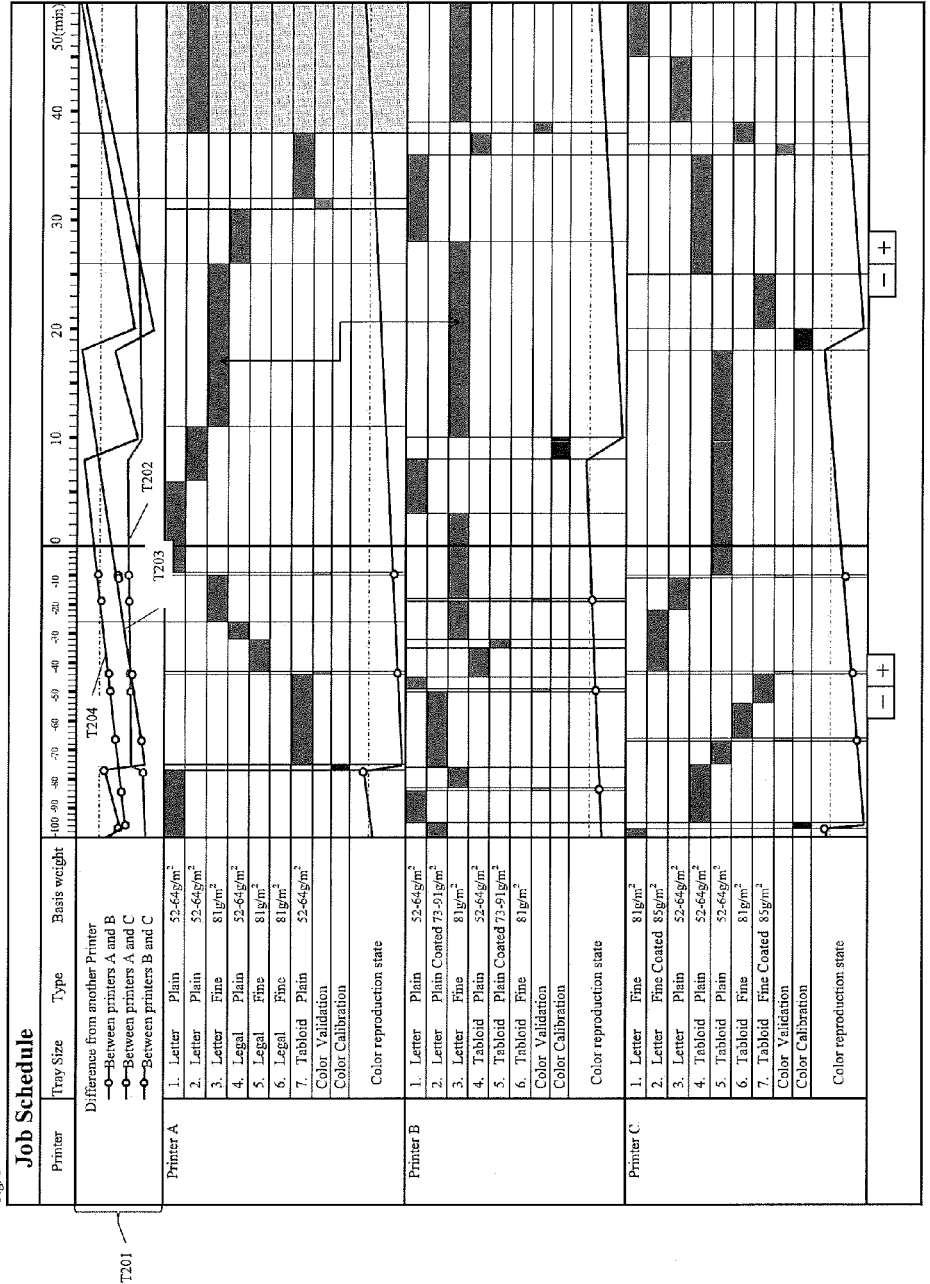
FIG. 8 is an illustration of a job scheduling window on a display unit or a graphical user interface of an exemplary device for use with the system as shown in FIG. 1 in accordance with a second exemplary embodiment.

FIG. 8 is an illustration of a job scheduling window on a display unit or a graphical user interface 104, 204, 304 of an exemplary device 110, 112, 114, 120, 130, 132, 134 for use with the system 100 as shown in FIG. 1 in accordance with a second exemplary embodiment. As shown in FIG. 8, the job scheduling GUI 104 of the second exemplary embodiment has an additional row T201 that contains graphs show the difference of color reproduction state between two printers at each point on the horizontal axis. The graph T202 shows the difference between the printers A and B. As shown in FIG. 15, the difference may be an average of color differences (delta E) of all color patches between L*a*b* value of the printer A and L*a*b* value of the printer B. The graphs corresponding to other combinations of the printers can also be depicted in the additional row.

$$\Delta E_n = \sqrt{((L*_{printerA} - L*_{printerB})^2 + (a*_{printerA} - a*_{printerB})^2 + (b*_{printerA} - b*_{printerB})^2)}$$

$$\text{Deference} = \frac{\left(\sum_{n=0}^{m} \Delta E_n\right)}{m}$$

In accordance with an exemplary embodiment, the operator can recognize or know relatively easily, the difference of the color reproduction state between two printers based on the additional row. For example, when an original job is split into plural split jobs and the split jobs are assigned to multi printers, it is desired that the printers have similar color reproduction state. In such a case, the operator can easily select a proper printer to which the split job is assigned by seeing the additional row.

In accordance with an alternative embodiment, when the operator selects (for example, points by using a mouse) an area corresponding to a given printer, a graph not being related to the given printer disappears, in other words, only graphs relating to the given printer remain. Specifically, when the operator selects a job bar corresponding to printer A, the lines of "Between printers A and B" and "Between printers A and C" remain. In addition, "Between printers B and C" disappears from the job scheduling screen and/or job scheduling window.

Figure 9:
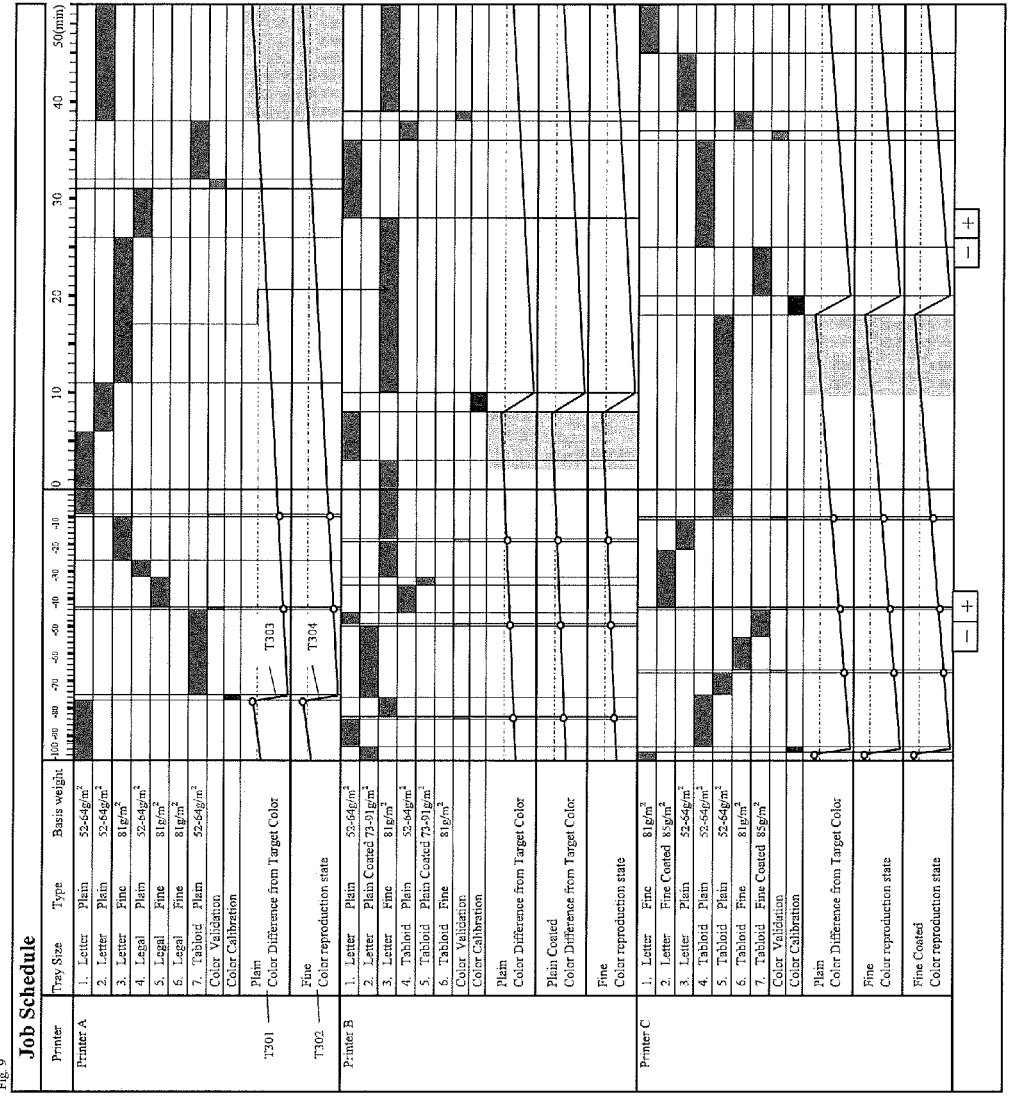
FIG. 9 is an illustration of a job scheduling window on a display unit or a graphical user interface of an exemplary device for use with the system as shown in FIG. 1 in accordance with a third exemplary embodiment.

FIG. 9 is an illustration of a job scheduling window on a display unit or a graphical user interface 104, 204, 304 of an exemplary device 120, 130, 132, 134 for use with the system 100 as shown in FIG. 1 in accordance with a third exemplary embodiment. In accordance with an exemplary embodiment, the change of color reproduction state T30 can be different depending on the paper type (or print media 160). For example, as shown, the job scheduling GUI of this embodiment has plural color reproduction state rows T301, T302 for paper types of which the paper or print media 160 is stored in the trays.

Figure 10:
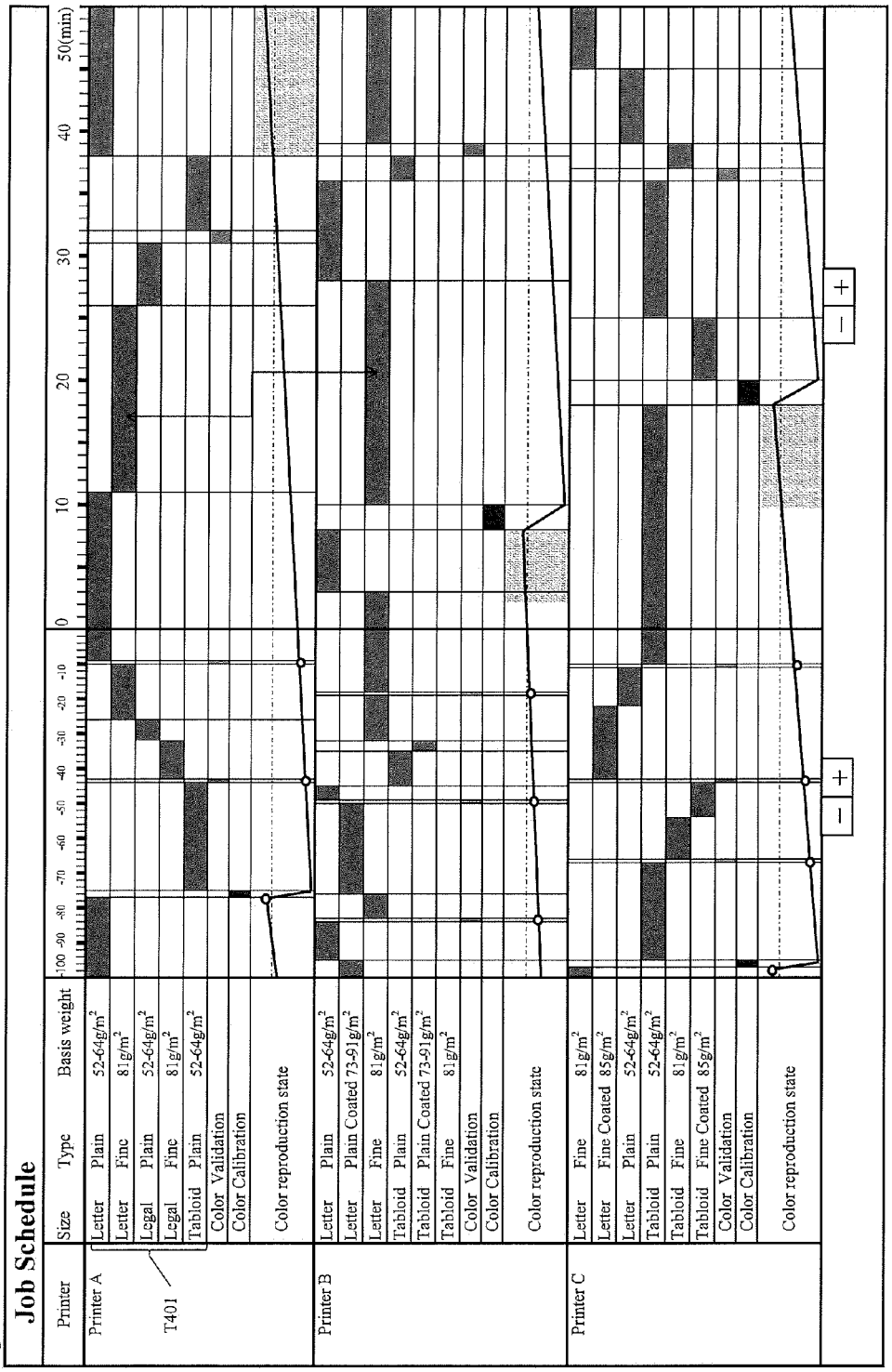
FIG. 10 is an illustration of a job scheduling window on a display unit or a graphical user interface of an exemplary device for use with the system as shown in FIG. 1 in accordance with a fourth exemplary embodiment.

FIG. 10 is an illustration of a job scheduling window on a display unit or a graphical user interface 104, 204, 304 of an exemplary device 120, 130, 132, 134 for use with the system 100 as shown in FIG. 1 in accordance with a fourth exemplary embodiment. In the prior embodiments, each tray is assigned into a separate single row along the vertical axis. In this embodiment, each kind of print media (combination of paper size, type and basis weight) is assigned into a separate single row T401. For example, when plural trays have paper of which kind of paper is same, the trays can be assigned into a same single row. Accordingly, for example, the job scheduling window may not include trays and/or tray numbers.

Figure 11:
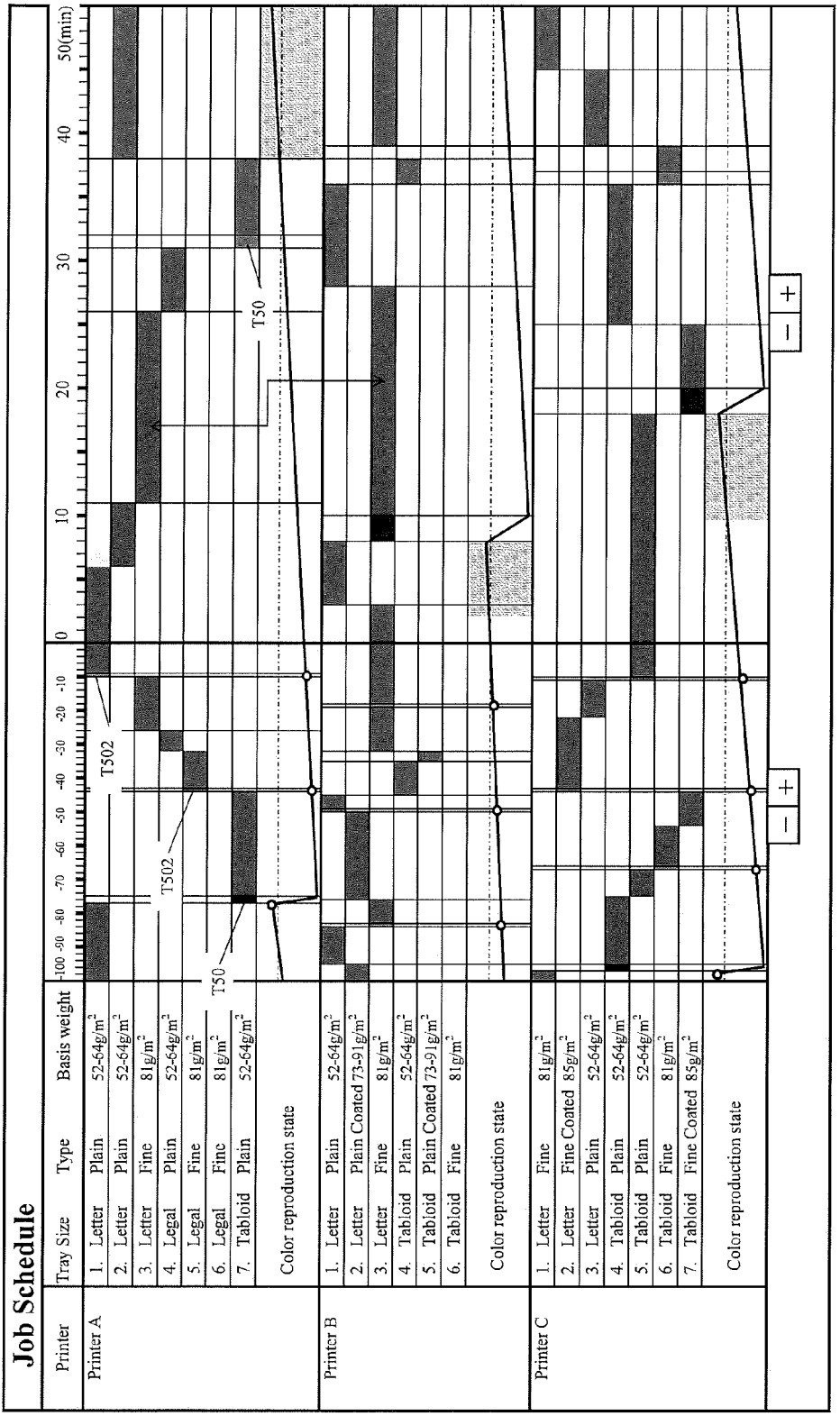
FIG. 11 is an illustration of a job scheduling window on a display unit or a graphical user interface of an exemplary device for use with the system as shown in FIG. 1 in accordance with a fifth exemplary embodiment.

FIG. 11 is an illustration of a job scheduling window on a display unit or a graphical user interface 104, 204, 304 of an exemplary device 120, 130, 132, 134 for use with the system 100 as shown in FIG. 1 in accordance with a firth exemplary embodiment. As shown in FIG. 11, the job scheduling GUI of this embodiment does not have the color validation row and the color calibration row. The color validation bar T501 and the color calibration bar T502, T50 are allocated in the corresponding tray in which the paper used in the validation or calibration process is stored. In accordance with an exemplary embodiment, the operator can relatively easily know a tray (paper) used for the validation and/or calibration process.

Figure 12A:
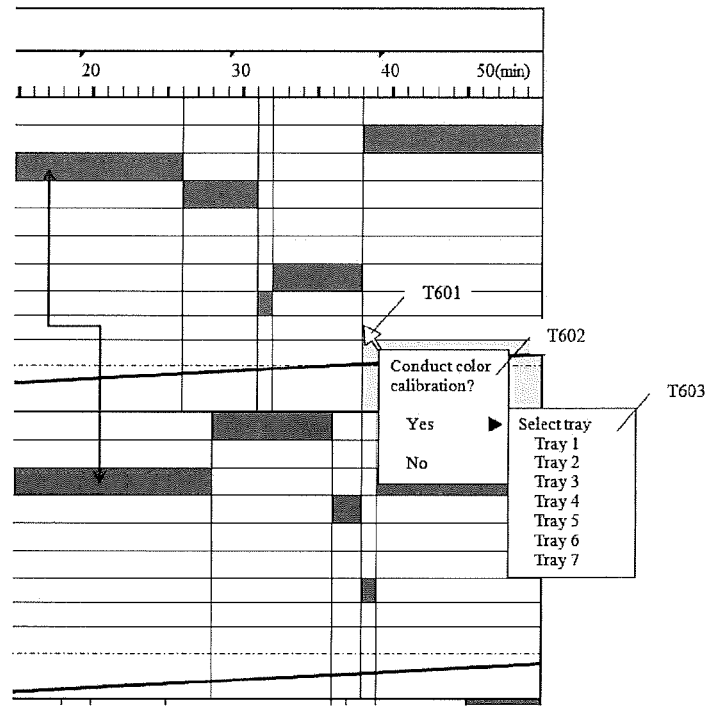
FIG. 12A is an illustration of a portion of a job scheduling window on a display unit or a graphical user interface of an exemplary device for use with the system as shown in FIG. 1 in accordance with an exemplary embodiment.
Figure 12B:
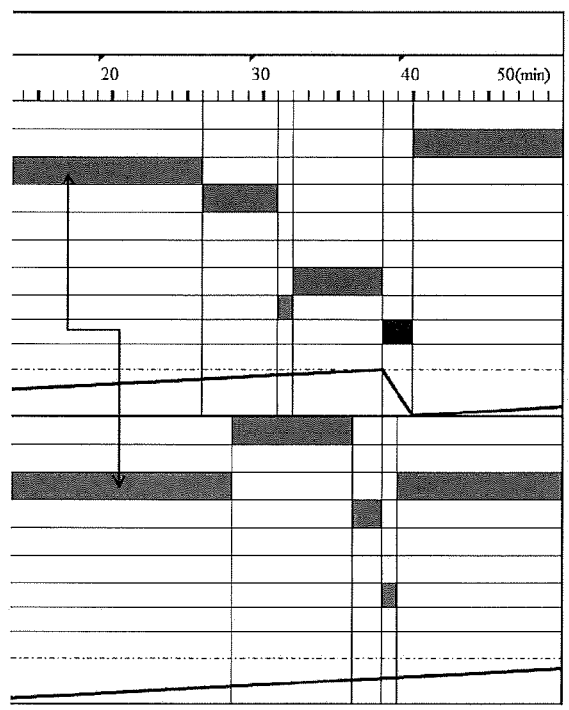
FIG. 12B is an illustration of a portion of a job scheduling window on a display unit or a graphical user interface of an exemplary device for use with the system as shown in FIG. 1 in accordance with an exemplary embodiment.

FIG. 12A is an illustration of a portion of a job scheduling window on a display unit or a graphical user interface 104, 204, 304 of an exemplary device 120, 130, 132, 134 for adding the validation or calibration process in accordance with an exemplary embodiment. Referring to FIG. 12A, when the operator does double click or right click while placing a cursor in a cell on the color calibration row, the window T602 is displayed. If the operator selects "Yes" in the window T602, the window T603 is displayed. The operator can select a tray to be used in the calibration process in the window T603. Because of the above-mentioned operation, a new color calibration bar (or cell) is generated in the color calibration row (FIG. 12B). In accordance with an exemplary embodiment, a validation bar (or cell) can be added by a similar way to the one of the calibration. For example, the window T603 can provide paper type selections instead of paper tray selections.

Figure 13:
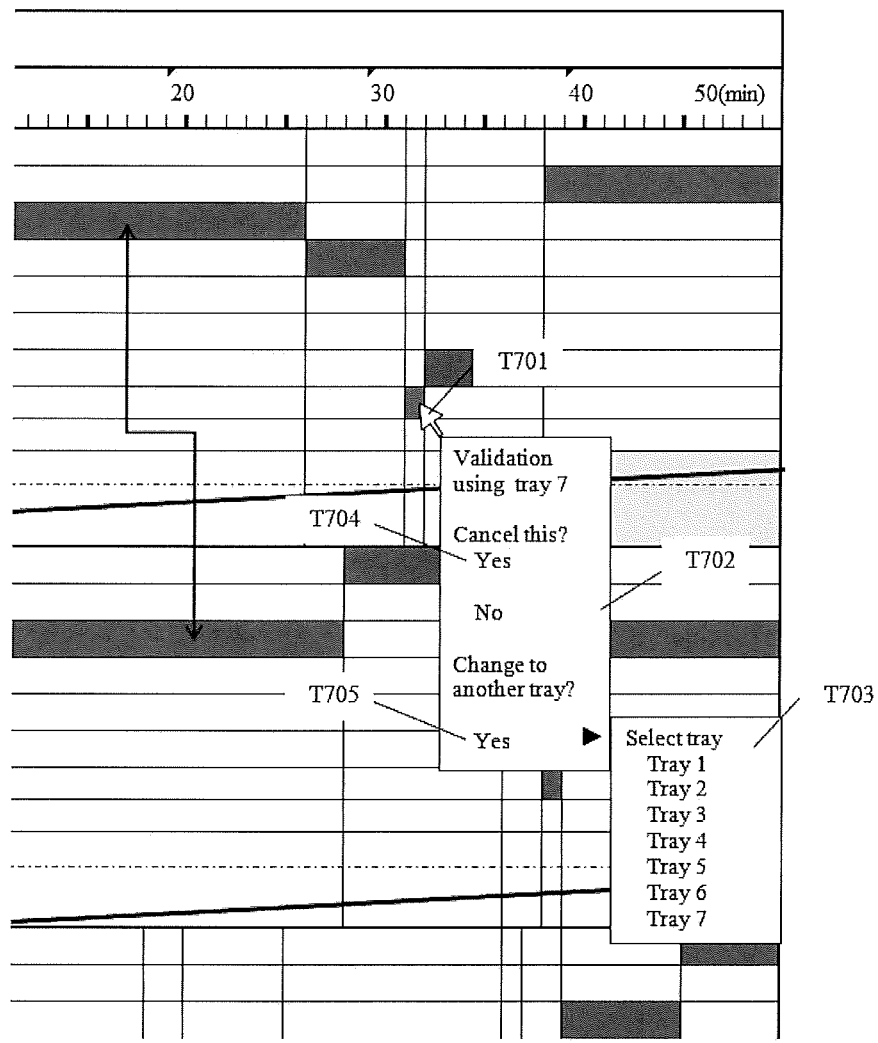
FIG. 13 is an illustration of a portion of a job scheduling window on a display unit or a graphical user interface of an exemplary device for use with the system as shown in FIG. 1 in accordance with an exemplary embodiment.

In accordance with an exemplary embodiment, for confirming or changing the setting of the validation or calibration process can be confirmed or changed by, for example, as shown in FIG. 13. As shown in FIG. 13, when the operator performs an operation, for example, a double click or a right click while placing a cursor in a color validation bar, the window T701 can be displayed. In addition, the operator can confirm a tray to be used in the validation process. If the operator selects "Yes" T702, the validation process is canceled and the corresponding color validation bar disappears. If the operator selects "No" T704, the window T703 is displayed. In accordance with an exemplary embodiment, the operator can change a tray to be used in the calibration process in the window T703. In addition, the window T702 and T703 can provide paper type selections instead of paper tray selections.

The timing of the validation or calibration process can also be changed. In accordance with an exemplary embodiment, when the operate moves the color calibration bar to another position (to previous/next job) by, for example, a drag and drop operation, the timing of the calibration process can be changed (advance/postpone). In addition, a validation bar can be operated by a similar way to the one of the calibration, by, for example, a drag and drop operation.

In accordance with an exemplary embodiment, the job management apparatus can send an alert on the due date. For example, each job usually has a due date. If some job will be behind the due date by adding the new validation or calibration process, the GUI 104 can show a warning message to the operator before adding new processes or jobs to the schedule.

In accordance with an exemplary embodiment, a computer program product comprising a computer usable non-transitory medium having a computer readable program code embedded therein for a job management apparatus, the job management apparatus managing a print job for at least one printer, wherein the code computer readable code configured to cause the job management apparatus to display a job scheduling screen, the process comprising: (a) obtaining first information on a job to be executed by the at least one printer; (b) obtaining second information on color reproduction state of the at least one printer; and (c) generating the job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer program product comprising a computer usable non-transitory medium having a computer readable program code embedded therein for a job management apparatus, the job management apparatus managing a print job for at least one printer, wherein the code computer readable code configured to cause the job management apparatus to display a job scheduling screen, the process comprising:
  obtaining first information on a job to be executed by the at least one printer;
  obtaining second information on color reproduction state of the at least one printer;
  generating the job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer; and illustrating a color validation bar and a color calibration bar on the second axis, the color validation bar and the color calibration bar illustrating a time for performing a color validation process and a color calibration process on the at least one printer, respectively.

2. The computer program product of claim 1, comprising: illustrating the color reproduction state of the at least one printer on the second axis in a form of a line extending along the first axis.

3. The computer program product of claim 2, comprising: providing an over criteria indicator for a region in which the color reproduction state exceeds the criteria line.

4. The computer program product of claim 1, comprising illustrating a difference of the color reproduction state between at least two printers on the second axis.

5. The computer program product of claim 4, wherein the difference of color reproduction state between the at least two printers on the second axis being an average of color difference of color patches between each of the at least two printers.

6. The computer program produce of claim 4, comprising: selecting an area corresponding to a printer of the at least two printers, and illustrating only the difference of the color reproduction state between the printer and each of the at least two printers.

7. The computer program product of claim 1, comprising: illustrating the color reproduction state for each print media within the at least one printer on the second axis in a form of a line which extends along the first axis.

8. The computer program product of claim 1, comprising: illustrating each tray of the at least one printer separately on the second axis, the each tray includes a job bar that illustrates a job history or planned job corresponding to the tray.

9. The computer program product of claim 1, comprising: illustrating each print media stored in at least one printer separately on the second axis, the each print media includes a job bar that illustrates a job history or planned job corresponding to the print media.

10. The computer program product of claim 1, comprising:
adding a validation process or calibration process to a print job by placing a cursor along the first axis in a color validation cell or a color calibration cell, and instructing the at least one printer to perform the validation process or the calibration process at a time or a paper count for the print job; or
canceling a scheduled color validation by placing the cursor in the color validation bar and instructing the at least one printer to cancel the scheduled color validation; or
changing a print media for the scheduled color calibration by placing the cursor in the color calibration bar and selecting a tray from a list of trays to be used for the color calibration.

11. The computer program product of claim 1, comprising:
changing a timing of a validation process or a calibration process for a print job by placing a cursor in the color calibration cell and instructing the at least one printer to perform the validation process or the calibration process at a time or a paper count for the print job; or canceling a scheduled color validation by placing the cursor in a color validation bar and instructing the at least one printer to cancel the scheduled color validation.

12. The computer program product of claim 1, wherein the first information on the job comprises:
a size of a print media, attributes of the print media, and/or a weight of the print media.

13. A method for generating a job scheduling screen on a job management apparatus, the job management apparatus managing a print job for at least one printer, the method comprising:
obtaining first information on a job to be executed by the at least one printer;
obtaining second information on color reproduction state of the at least one printer;
generating the job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer; and
illustrating a color validation bar and a color calibration bar on the second axis, the color validation bar and the color calibration bar illustrating a time for performing a color validation process and a color calibration process on the at least one printer, respectively.

14. The method of claim 13, comprising:
illustrating the color reproduction state of the at least one printer on the second axis in a form of a line extending along the first axis; and
providing an over criteria indicator for a region in which the color reproduction state exceeds the criteria line.

15. The method of claim 13, comprising
illustrating a difference of the color reproduction state between at least two printers on the second axis, and wherein the difference of color reproduction state between the at least two printers on the second axis being an average of color difference of color patches between each of the at least two printers; and
selecting an area corresponding to a printer of the at least two printers, and illustrating only the difference of the color reproduction state between the printer and each of the at least two printers.

16. The method of claim 13, comprising:
illustrating the color reproduction state for each print media within the at least one printer on the second axis in a form of a line which extends along the first axis; and/or
illustrating each tray of the at least one printer separately on the second axis, the each tray includes a job bar that illustrates a job history or planned job corresponding to the tray.

17. The method of claim 13, comprising:
illustrating each print media stored in at least one printer separately on the second axis, the each print media includes a job bar that illustrates a job history or planned job corresponding to the print media;
adding a validation process or calibration process to a print job by placing a cursor along the first axis in a color validation cell or a color calibration cell, and instructing the at least one printer to perform the validation process or the calibration process at a time or a paper count for the print job;

canceling a scheduled color validation by placing the cursor in the color validation bar and instructing the at least one printer to cancel the scheduled color validation;

changing a print media for the scheduled color calibration by placing the cursor in the color calibration bar and selecting a tray from a list of trays to be used for the color calibration;

changing a timing of a validation process or a calibration process for a print job by placing a cursor in the color calibration cell and instructing the at least one printer to perform the validation process or the calibration process at a time or a paper count for the print job; and/or canceling a scheduled color validation by placing the cursor in a color validation bar and instructing the at least one printer to cancel the scheduled color validation.

18. A job management apparatus managing a print job for at least one printer, the job management apparatus comprising:
 a processor configured to
  obtain first information on a job to be executed by the at least one printer; and
  obtain second information on color reproduction state of the at least one printer; and
 a job scheduling screen, wherein the job scheduling screen is a two dimensional chart in which a first axis indicates an execution length of time for the job or a number of sheets of paper to be used for the job, and in which a part of a second axis of the two dimensional chart indicates the color reproduction state of the at least one printer, and wherein a color validation bar and a color calibration bar are illustrated on the second axis, the color validation bar and the color calibration bar illustrating a time for performing a color validation process and a color calibration process on the at least one printer, respectively.

19. The job management apparatus of claim 18, wherein the processor is configured to:
 illustrate the color reproduction state of the at least one printer on the second axis in a form of a line extending along the first axis; and
 provide an over criteria indicator for a region in which the color reproduction state exceeds the criteria line.

20. The job management apparatus of claim 18, wherein the processor is configured to:
 illustrate a difference of the color reproduction state between at least two printers on the second axis, wherein the difference of color reproduction state between the at least two printers on the second axis being an average of color difference of color patches between each of the at least two printers.

* * * * *